(12) United States Patent
Vaidyanathan et al.

(10) Patent No.: US 8,224,955 B2
(45) Date of Patent: Jul. 17, 2012

(54) ENSURING AFFINITY AT ALL AFFINITY DOMAINS BY FOLDING AT EACH AFFINITY LEVEL POSSIBLE FOR A PARTITION SPANNING MULTIPLE NODES

(75) Inventors: Basu Vaidyanathan, Austin, TX (US); Marcos A. Villarreal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 12/437,035

(22) Filed: May 7, 2009

(65) Prior Publication Data

US 2010/0287279 A1 Nov. 11, 2010

(51) Int. Cl.
G06F 15/173 (2006.01)
(52) U.S. Cl. ......... 709/224; 709/223; 709/202; 709/203
(58) Field of Classification Search .................. 709/226, 709/223, 224, 203, 202
See application file for complete search history.

(56) References Cited

U.S. PATENT DOCUMENTS

| | | | |
|---|---|---|---|
| 5,930,511 A | 7/1999 | Hinsley | |
| 6,134,216 A | 10/2000 | Gehi et al. | |
| 6,728,961 B1 | 4/2004 | Velasco | |
| 6,947,752 B2 | 9/2005 | Collins | |
| 2003/0208641 A1 | 11/2003 | Wesemann | |
| 2005/0204033 A1* | 9/2005 | Venugopal et al. | 709/224 |
| 2007/0043347 A1* | 2/2007 | Solomita et al. | 606/33 |
| 2008/0162700 A1* | 7/2008 | Aborn | 709/226 |

\* cited by examiner

*Primary Examiner* — Lan-Dai T Truong
(74) *Attorney, Agent, or Firm* — Yee & Associates, P.C.; David A. Mims, Jr.

(57) ABSTRACT

The different illustrative embodiments provide a method, apparatus, and computer program product for folding at each affinity level for a partition spanning multiple nodes. In one illustrative embodiment, a method is provided for identifying a number of domains in a number of affinity levels. A lightest loaded domain is identified in the number of domains identified. A number of nodes are identified in the lightest loaded domain identified. A lightest loaded node is identified in the number of nodes. A lightest loaded processing unit on the lightest loaded node is identified and the lightest loaded processing unit is folded.

3 Claims, 8 Drawing Sheets

US 8,224,955 B2

ENSURING AFFINITY AT ALL AFFINITY DOMAINS BY FOLDING AT EACH AFFINITY LEVEL POSSIBLE FOR A PARTITION SPANNING MULTIPLE NODES

BACKGROUND

1. Field

The disclosure relates generally to partitions spanning multiple nodes and more specifically to ensuring affinity at all affinity domains for a partition spanning multiple nodes.

2. Description of the Related Art

Non-Uniform Memory Access or Non-Uniform Memory Architecture (NUMA) is a computer memory design used in multiprocessors, where the memory access time depends on the memory location relative to a processor. Under NUMA, a processor can access its own local memory faster than non-local memory, that is, memory local to another processor or memory shared between processors. This memory access time is often referred to as affinity. In other words, the closer a processor is to its associated memory, the greater the affinity of that processor. Often, multiple processors will run on a single partition, sharing central processing unit time as well as memory. These processors may be virtual processors, or virtual machines, which execute operating systems or programs. One or more of these processors may be folded in order to unload work off of the folded processor. This processor folding allows a folded processor to donate its central processing unit time to other processors running on the same partition.

SUMMARY

According to one illustrative embodiment, a method is provided for identifying a number of domains in a number of affinity levels. A lightest loaded domain is identified in the number of domains identified. A number of nodes are identified in the lightest loaded domain identified. A lightest loaded node is identified in the number of nodes. A lightest loaded processing unit is identified on the lightest loaded node and the lightest loaded processing unit is folded.

DETAILED DESCRIPTION

Figure 1:
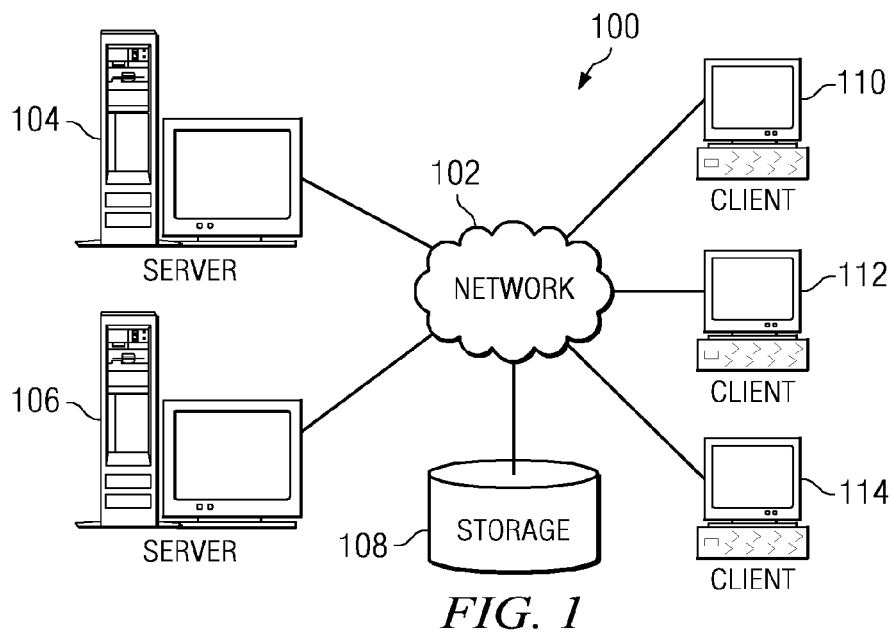
FIG. 1 depicts a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
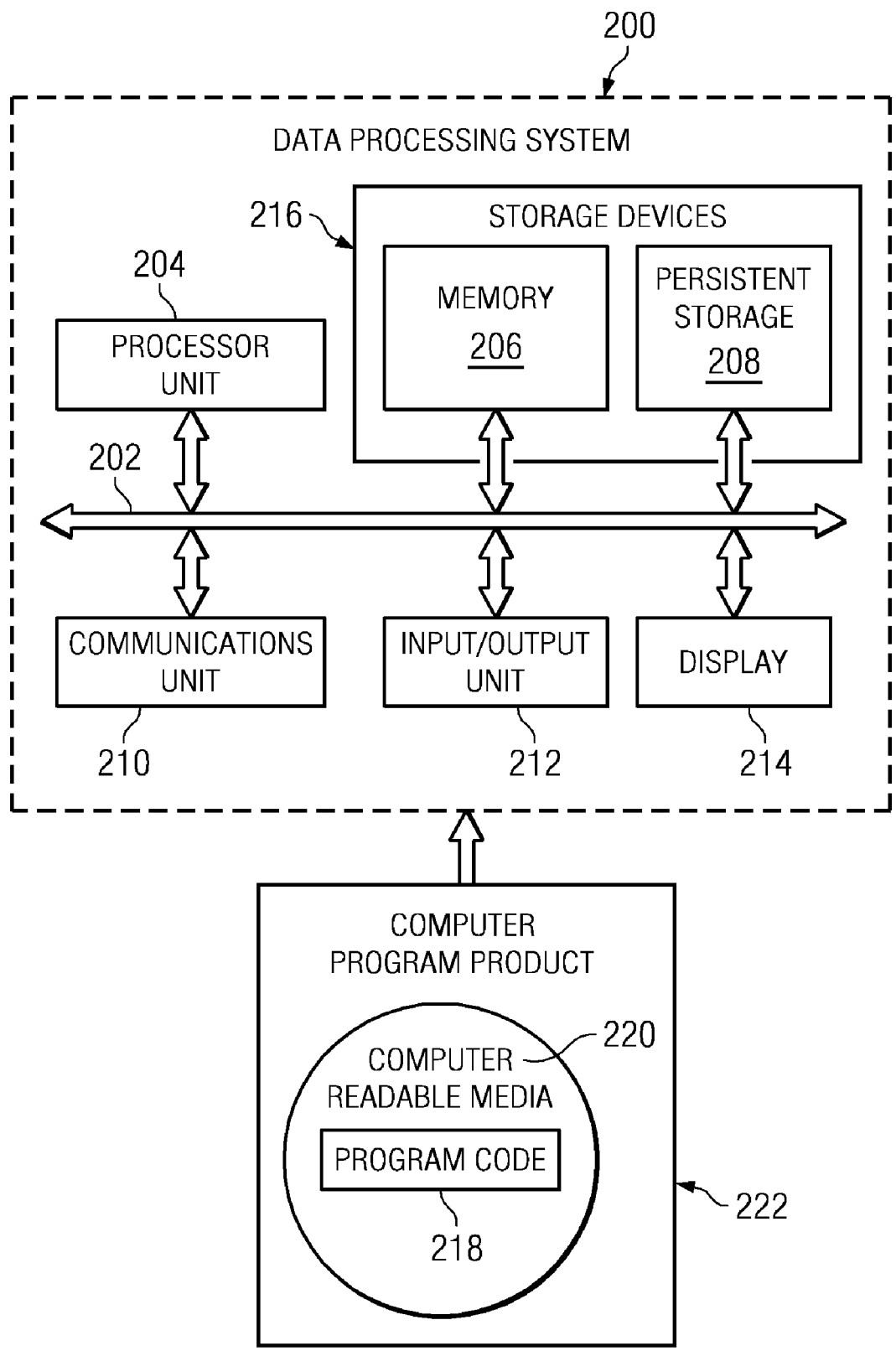
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). A number as used herein when referring to items means one or more items. For example, a number of different types of networks is one or more different types of networks. FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different illustrative embodiments recognize that current methods of processor folding are executed at the partition level. If the partition is idle, a virtual processor is folded. If the partition is busy, a virtual processor is unfolded. The current algorithm used to select a virtual processor to fold simply selects the processor with the highest central processing unit identifier in the sequence. Problems may arise in current methods when the non-uniform memory access (NUMA) properties of the partition are ignored. If the selected processor is the last available processor at the lowest affinity domain level, the partition essentially loses a level of affinity. As a result of losing the level of affinity, the processes and/or threads which had affinity at that level may be forced to migrate to another affinity domain. This migration defeats the purpose of trying to balance the workload of a partition.

The different illustrative embodiments also recognize that current methods may encounter additional problems with a selected processor to be folded belongs to that of a heavily loaded affinity domain. Removing processing power from a heavily loaded affinity domain may force work to be run on a different domain level. The performance impact of removing processing power from a heavily loaded affinity domain is much greater than removing processing power from a less loaded domain level.

Therefore, the different illustrative embodiments provide a method, apparatus, and computer program product for folding at each affinity level for a partition spanning multiple nodes. In one illustrative embodiment, a method is provided for identifying a number of domains in a number of affinity levels. A lightest loaded domain is identified in the number of domains identified. A number of processing units are identified in the lightest loaded domain identified. A lightest loaded processing unit is identified in the number of processing units, and the lightest loaded processing unit is folded.

The different illustrative embodiments also provide a method for identifying a highest affinity level in a number of affinity levels. At least one affinity level in the number of affinity levels has a number of domains, and at least one domain in the number of domains includes a number of processing units. A determination is made as to whether folding one domain at the highest affinity level results in folding a last processing unit at the highest affinity level. In response to a determination that folding one domain at the highest affinity level does not result in folding the last processing unit, a domain load is determined for each domain at the highest affinity level. A lightest loaded domain is identified. In response to identifying the lightest loaded domain, a determination is made as to whether the lightest loaded domain is a processing unit. If the lightest loaded domain is a processing unit, the lightest loaded domain is folded.

Figure 3:
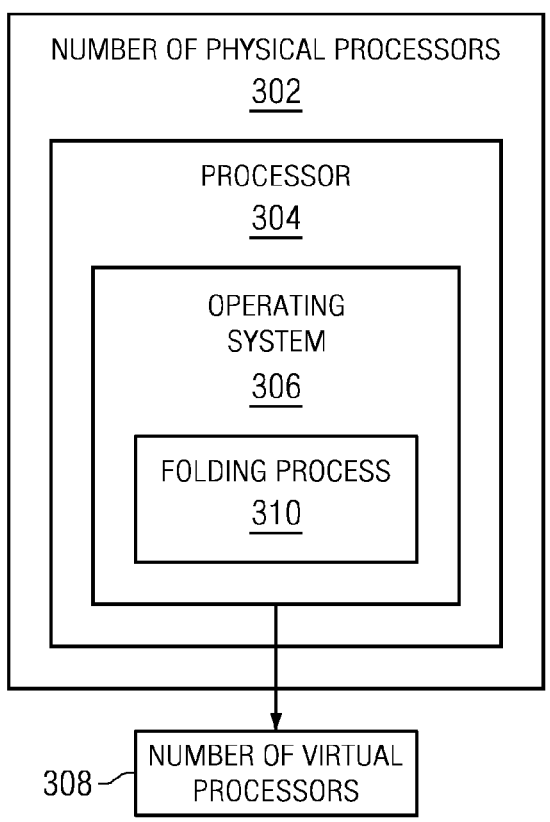
FIG. 3 is a block diagram of a folding environment in accordance with the illustrative embodiments.

With reference now to FIG. 3, a block diagram of a folding environment is depicted in accordance with the illustrative embodiments. Folding environment 300 may be implemented in a network, such as network 102 in FIG. 1, for example.

Folding environment 300 includes number of physical processors 302. Number of physical processors 302 may an example of one implementation of data processing system 200 in FIG. 2, for example. Processor 304 is an example of one processing unit in number of physical processors 302.

Operating system 306 may execute on number of physical processors 302 and/or number of virtual processors 308. Folding process 310 may be executed by operating system 306 to manage central processing unit allocation for number of physical processors 302 and number of virtual processors 308.

Folding process 310 may be used when the workload demanded of a number of processing units, such as number of physical processors 302 and number of virtual processors 308, can be accomplished with one or more fewer processing units. By concentrating the workload on fewer processing units, the data running on the processing units will be mostly cached and will require minimal access to non-local memory in order to run. Folding a processing unit directs work off of the folded processor and onto other processors. In essence, folding process 310 tells operating system 306 to temporarily ignore a folded processing unit. Folded refers to a state of a processing unit, and operating system 306 may recognize this state when allocating work to the number of different processing units.

Figure 4:
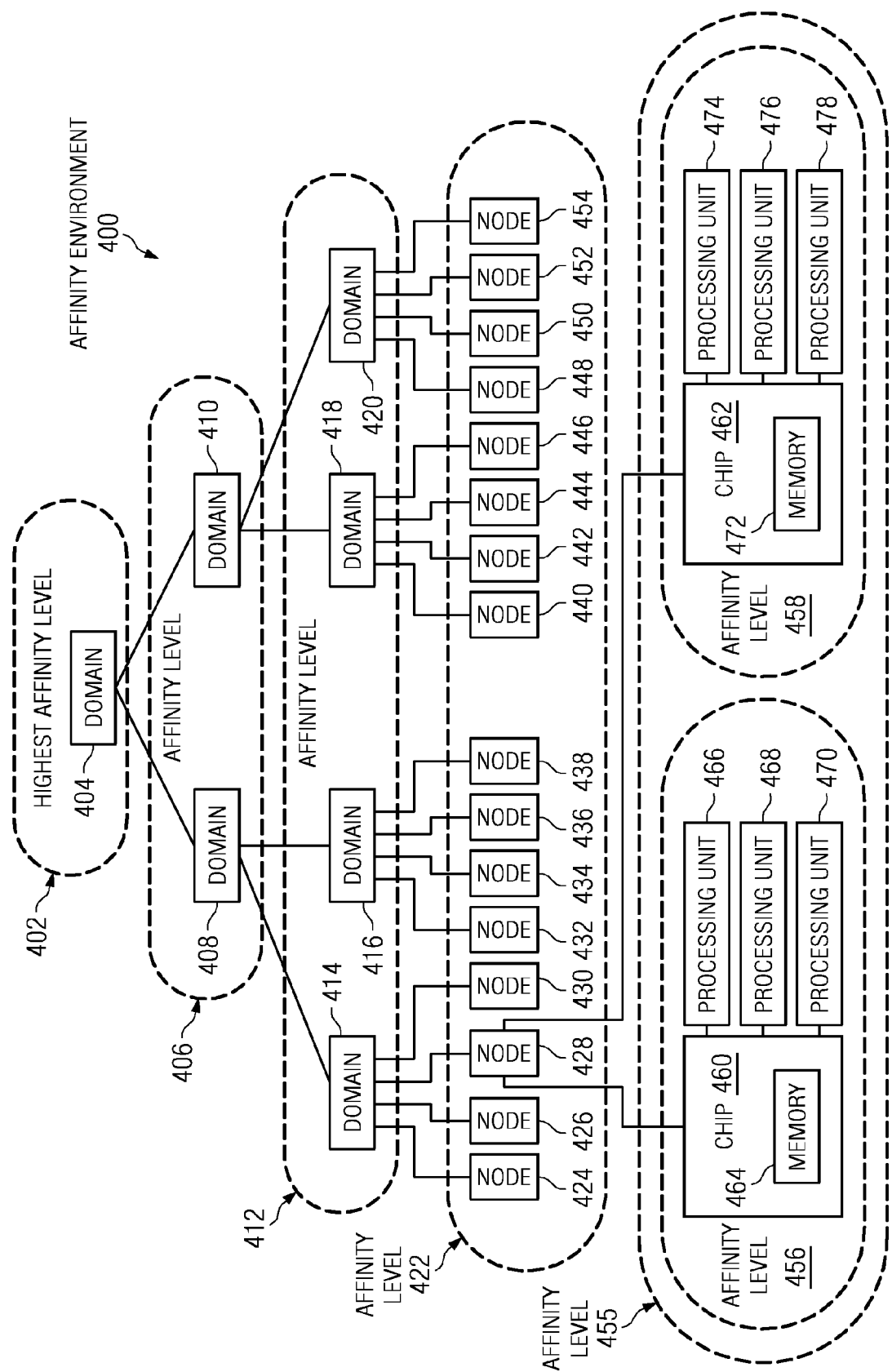
FIG. 4 is a block diagram of an affinity environment in accordance with the illustrative embodiments

With reference now to FIG. 4, a block diagram of an affinity environment is depicted in accordance with the illustrative embodiments. Affinity environment 400 may be implemented in a network, such as network 102 in FIG. 1, for example. Affinity environment 400 may be implemented concurrently with folding environment 300 in FIG. 3, in an illustrative embodiment.

In the illustrative embodiments, affinity refers to the memory locality in relation to a processor accessing that memory. In other words, affinity is used with a group of processors to refer to how close one or more processors in the group are to a certain level of memory. The levels of memory are the affinity levels.

In one illustrative example, processor cache memory may be the closest affinity for a processing unit. The next closest affinity for a processing unit may be chip cache memory of the chip on which the processing unit is located. The chip cache of a chip can be shared by a number of processing units on the chip. The next closest affinity then may be the chip cache on another chip within same node. After that, the next closest affinity may be a chip cache on a chip on a different node. As used herein, a node may be a group of chips connected by a system bus or fabric bus, such as communications fabric 202 in FIG. 2, for example. A node may be found in a computer, a gaming system, a router, or some other type of device that contains the components illustrated in FIG. 3. In another illustrative example, more than one node may be found in a device.

Affinity environment 400 includes a number of affinity levels and a number of domains. Highest affinity level 402 includes domain 404. Domain 404 includes domain 408 and domain 410. Domain 408 and domain 410 may be sub-domains within domain 404. Domain 408 and domain 410 are at affinity level 406. Domain 408 includes domain 414 and domain 416. Domain 410 includes domain 418 and domain 420. Each of domains 414, 416, 418, and 420 are at affinity level 412. Domain 414 includes node 424, node 426, node 428, and node 430. Domain 416 includes node 432, node 434, node 436, and node 438. Domain 418 includes node 440, node 442, node 444, and node 446. Domain 420 includes node 448, node 450, node 452, and node 454. Each of nodes 424, 426, 428, 430, 432, 434, 436, 438, 440, 442, 444, 446, 448, 450, 452, and 454 are at affinity level 422.

Each of nodes 424, 426, 428, 430, 432, 434, 436, 438, 440, 442, 444, 446, 448, 450, 452, and 454 may communicate using a fabric bus, such as communications fabric 202 in FIG. 2 for example. Each node may include a number of chips. As used herein, a number refers to one or more chips. In an illustrative embodiment, where a node includes two or more chips, each chip in the number of chips on a node may communicate with another chip on the node using a fabric bus. Each chip may also include a memory unit. The number of chips on a node, such as node 428 for example, shares affinity at affinity level 455. The lowest affinity level may be at the chip level, such as affinity level 456 and affinity level 458, for example, where the number of processing units on an individual chip shares affinity with the memory of that chip.

A number of processing units may be grouped on each chip within a node, such as node 428 for example. In one illustrative embodiment, node 428 may depict an example of a number of chips located on node 428. Node 428 includes chip 460 and chip 462. Chip 460 may include processing unit 466, processing unit 468, and processing unit 470. Each of processing units 466, 468, and 470 has affinity with memory 464 on chip 460 within affinity level 456. Processing units 466, 468, and 470 may be able to access memory 464 faster than any other memory, such as memory 472 on chip 462, or memory on a different node, such as node 424 for example. Chip 462 may include memory 472, processing unit 474, processing unit 476, and processing unit 478. Each of processing units 473, 476, and 478 has affinity with memory 472 on chip 462 within affinity level 458.

Figure 5:
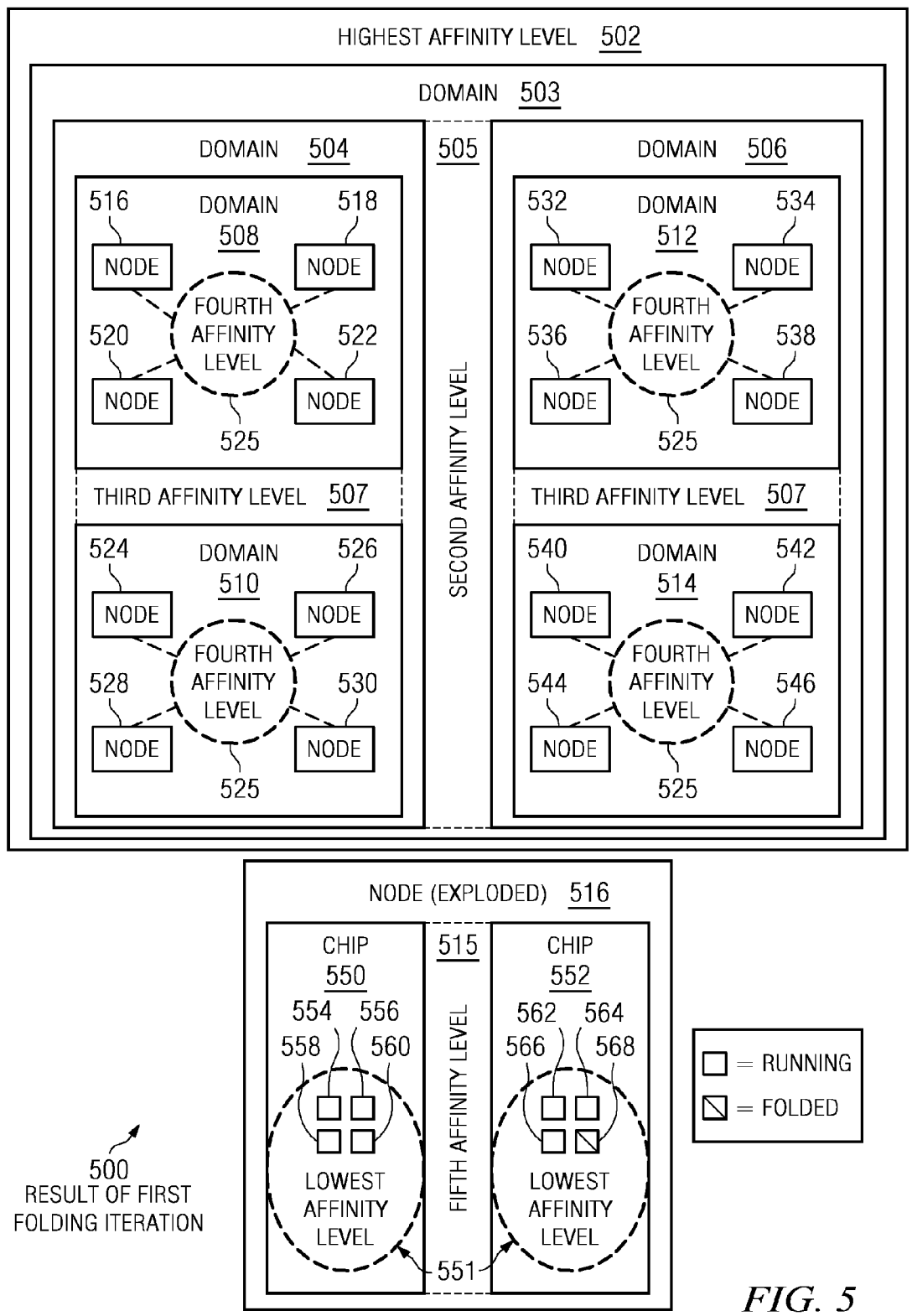
FIG. 5 is an illustration of a result of a first folding iteration in accordance with the illustrative embodiments.

With reference now to FIG. 5, an illustration of a result of a first folding iteration is depicted in accordance with the illustrative embodiments. Result of first folding iteration 500 may be implemented by folding process 310 in FIG. 3.

Highest affinity level 502 includes domain 503. Domain 503 may include domain 504 and domain 506, where domain 504 and domain 506 are sub-domains of domain 503. Domain 504 and domain 506 may share affinity at second affinity level 505.

Domain 504 may include domain 508 and domain 510, where domain 508 and domain 510 are sub-domains of domain 504. Domain 508 and domain 510 may share affinity at third affinity level 507. Similarly, domain 506 may include domain 512 and domain 514, where domain 512 and domain 514 are sub-domains of domain 506. Domain 512 and domain 514 may also share affinity at third affinity level 507.

Each of domains 508, 510, 512, and 514 may include a number of nodes. The number of nodes may include, for example, without limitation, a number of virtual processors, a number of physical processors, or a combination of a number of virtual processors and a number of physical processors. As used herein, a number refers to one or more nodes. For example, domain 508 may include node 516, node 518, node 520, and node 522. Each of node 516, node 518, node 520, and node 522 share affinity at fourth affinity level 525. Domain 510 may include node 524, node 526, node 528, and node 530. Each of node 524, node 526, node 528, and node 530 also share affinity at fourth affinity level 525. Domain 512 may include node 532, node 534, node 536, and node 538. Each of node 532, node 534, node 536, and node 538 also share affinity at fourth affinity level 525. Domain 514 may include node 540, node 542, node 544, and node 546. Each of node 540, node 542, node 544, and node 546 also share affinity at fourth affinity level 525.

Each node may include a number of chips. Each chip may include a number of processing units. In an illustrative example, node 516 may include chip 550 and chip 552. Chip 550 and chip 552 share affinity at fifth affinity level 515. Chip 550 may include processing unit 554, processing unit 556, processing unit 558, and processing unit 560. Processing units 554, 556, 558, and 560 share affinity with each other at lowest affinity level 751. Chip 552 may include processing unit 562, processing unit 564, processing unit 566, and processing unit 568. Processing units 562, 564, 566, and 568 share affinity with each other at lowest affinity level 751.

When a folding process, such as folding process 310 in FIG. 3 for example, executes on an operation system to free up central processing unit time, the folding process may iterate through the affinity levels until it identifies the lightest loaded domain. The lightest loaded processing unit in the lightest loaded domain is then folded, providing more central processing unit time to be allocated to heavier loaded domains.

In this illustrative example, the folding process may begin at highest affinity level 502. The process may determine that folding domain 503 at highest level 502 would result in folding the last node, because it would necessarily fold every node in domain 503. The process would then move to second affinity level 505, and determine which of domains 504 and 506 had the lighter load. The process may determine that domain 504 has a lighter load than domain 506, and may then move to third affinity level 507. At third affinity level 507, the process would determine which of domains 508 and 510 had the lighter load. The process may determine that domain 508 has a lighter load than domain 510. The process may also determine that folding one node within domain 508 would not result in folding the last node of domain 508, as domain 508 has four nodes currently running. The process may then determine which node of domain 508 has the lightest load, and may determine that node 516 has the lightest load. The process then identifies the lightest loaded processing unit of node 516, which is this illustrative example is processing unit 568. The process would then fold processing unit 568 on node 516. The process could recursively execute until the lightest loaded processing unit was found in any number of affinity levels and any number of domains. Once a processing unit has been folded, the process returns to highest affinity level 502 and executes again.

Figure 6:
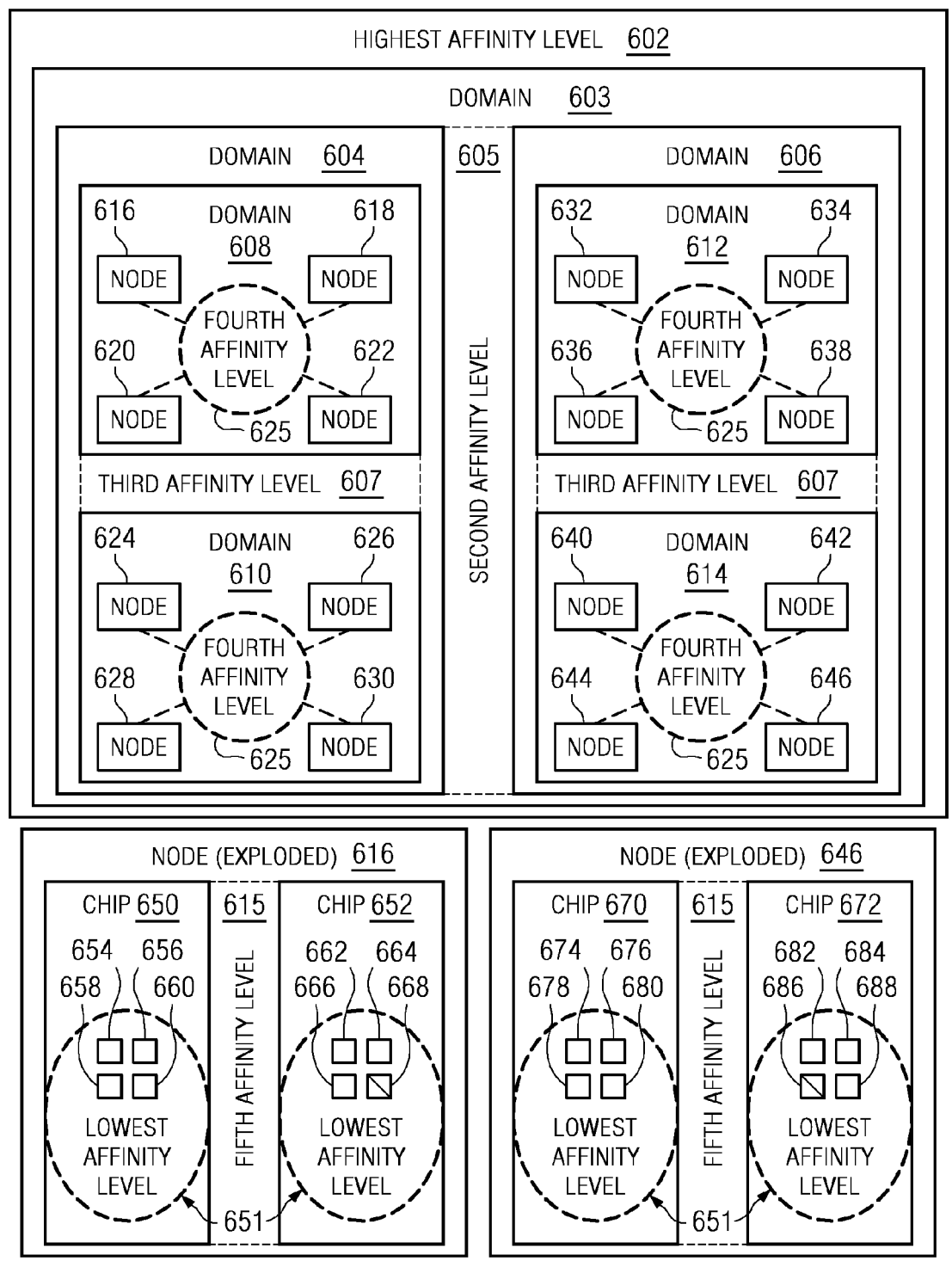
FIG. 6 is an illustration of a result of a second folding iteration in accordance with the illustrative embodiments.

With reference now to FIG. 6, an illustration of a result of a second folding iteration is depicted in accordance with the illustrative embodiments. Result of second folding iteration 600 may be implemented by folding process 310 in FIG. 3. Result of second folding iteration 600 may be a result of folding process executing after result of first folding iteration 500 in FIG. 5, for example.

In this illustrative example, the folding process may begin at highest affinity level 602. The process may determine that folding domain 603 at highest level 602 would result in folding the last node, because it would necessarily fold every node in domain 603. The process would then move to second affinity level 605, and determine which of domains 604 and 606 had the lighter load. The process may determine that domain 606 has a lighter load than domain 604, and may then move to third affinity level 607. At third affinity level 607, the process would determine which of domains 612 and 614 had the lighter load. The process may determine that domain 614 has a lighter load than domain 612. The process may also determine that folding one node within domain 614 would not result in folding the last node of domain 614, as domain 614 has four nodes currently running. The process may then determine which node of domain 614 has the lightest load, and may determine that node 646 has the lightest load. The process then identifies the lightest loaded processing unit of node 646, which is this illustrative example is processing unit 686. The process would then fold processing unit 686 of node 646. The process could recursively execute until the lightest loaded processing unit was found in any number of affinity levels and any number of domains. Once a processing unit has been folded, the process returns to highest affinity level 602 and executes again.

Figure 7:
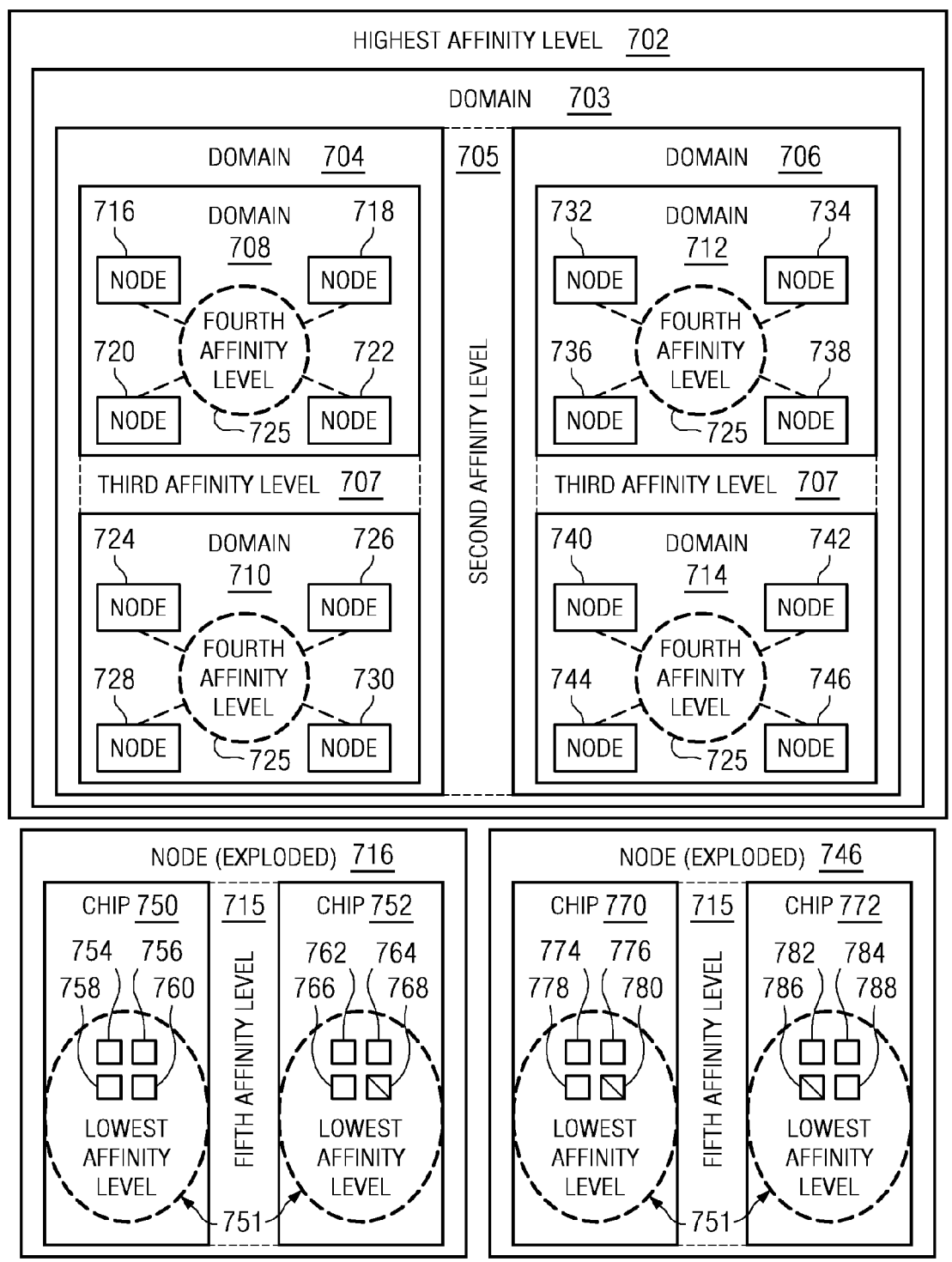
FIG. 7 is an illustration of a result of a third folding iteration in accordance with the illustrative embodiments.

With reference now to FIG. 7, an illustration of a result of a third folding iteration is depicted in accordance with the illustrative embodiments. Result of third folding iteration 700 may be implemented by folding process 310 in FIG. 3. Result of third folding iteration 700 may be a result of folding process executing after result of second folding iteration 600 in FIG. 6, for example.

In this illustrative example, the folding process may begin at highest affinity level 702. The process may determine that folding domain 703 at highest level 702 would result in folding the last node, because it would necessarily fold every node in domain 703. The process would then move to second affinity level 705, and determine which of domains 704 and 706 had the lighter load. The process may determine that domain 706 has a lighter load than domain 704, and may then move to third affinity level 707. At third affinity level 707, the process would determine which of domains 712 and 714 had the lighter load. The process may determine that domain 714 has a lighter load than domain 712. The process may also determine that folding one node within domain 714 would not result in folding the last node of domain 714, as domain 714 has four nodes currently running. The process may then determine which node of domain 714 has the lightest load, and may determine that node 746 has the lightest load. The process then identifies the lightest loaded processing unit of node 746, which is this illustrative example is processing unit 780, as processing unit 786 was previously folded in the second iteration, depicted in FIG. 6. The process would then fold processing unit 780 of node 742. The process could recursively execute until the lightest loaded processing unit was found in any number of affinity levels and any number of domains. Once a processing unit has been folded, the process returns to highest affinity level 702 and executes again.

Figure 8:
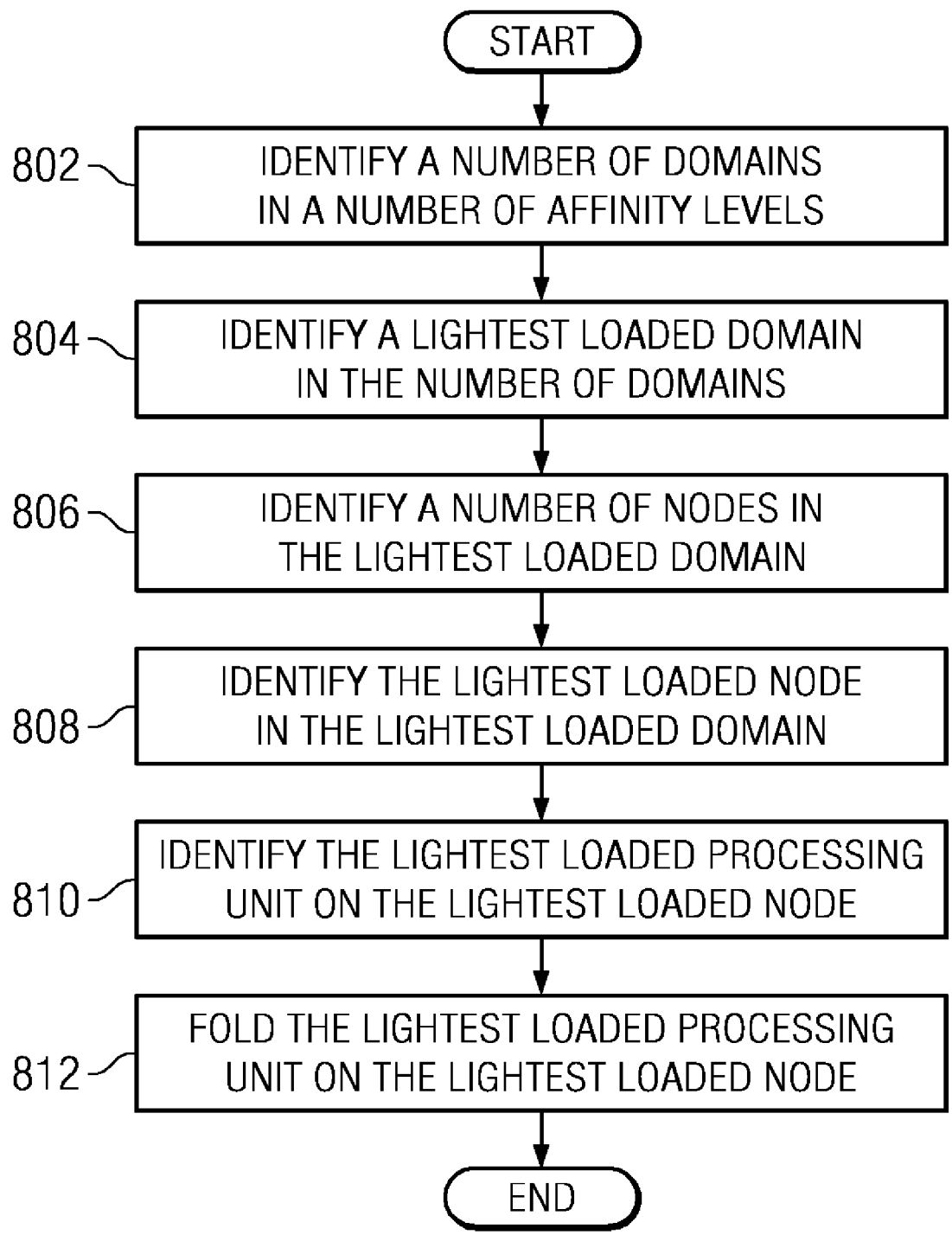
FIG. 8 is a flowchart illustrating a process for folding a lightest loaded node in accordance with the illustrative embodiments.

With reference now to FIG. 8, a flowchart illustrating a process for folding a lightest loaded processing unit is depicted in accordance with the illustrative embodiments. The process in FIG. 8 may be implemented by a folding process, such as folding process 310, executing on a processing unit, such as processor 304 in FIG. 3.

The process begins by identifying a number of domains in a number of affinity levels (step 802). As used herein, a number refers to one or more domains and/or affinity levels. The process then identifies a lightest loaded domain the number of domains (step 804). Next, the process identifies a number of nodes in the lightest loaded domain (step 806). The process identifies the lightest loaded node in the lightest loaded domain (step 808). The process identifies the lightest loaded processing unit on the lightest loaded node (step 810). The process then folds the lightest loaded processing unit on lightest loaded node (step 812), with the process terminating thereafter.

Figure 9:
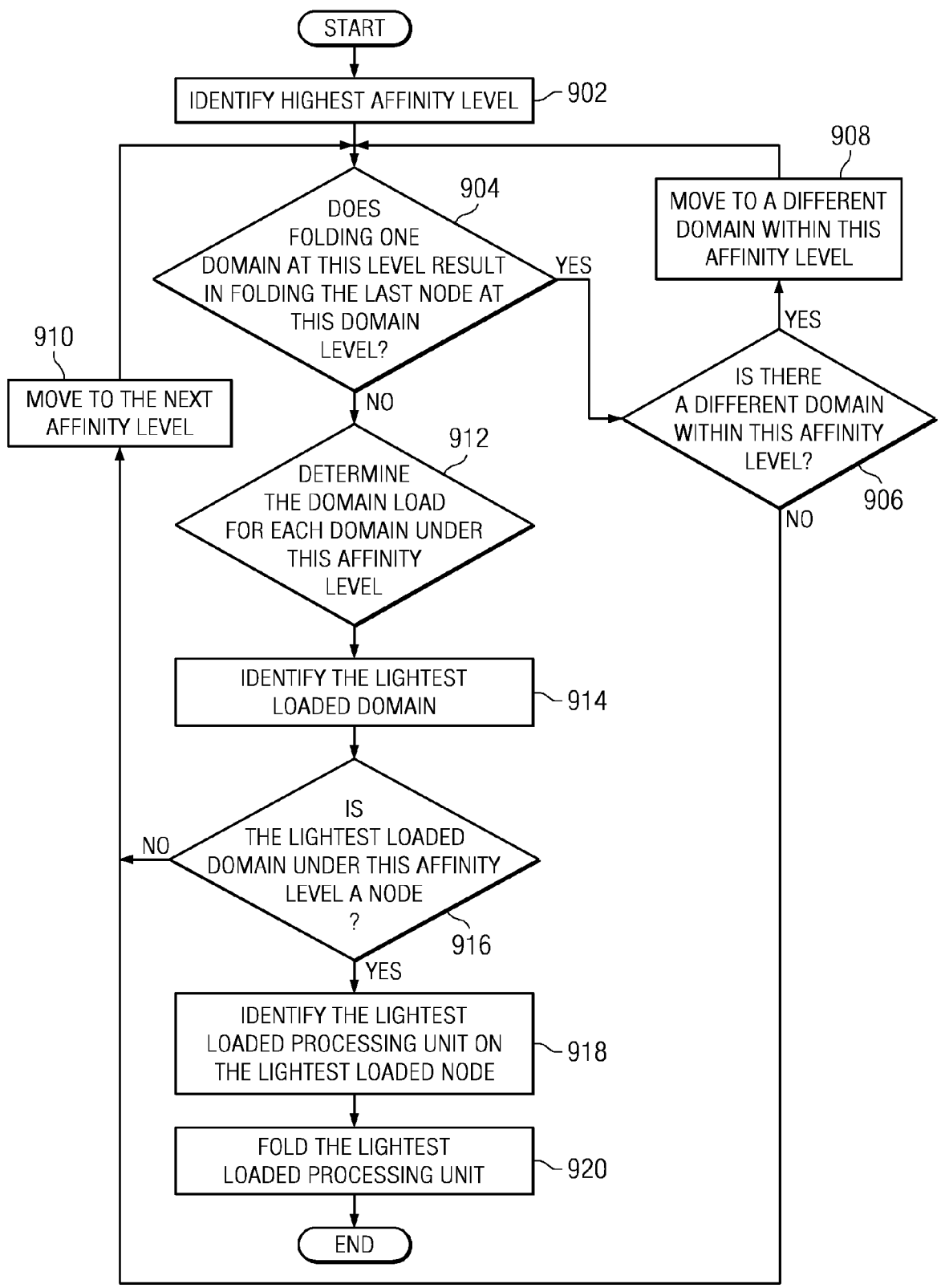
FIG. 9 is a flowchart illustrating a process for a folding iteration in accordance with the illustrative embodiments.

With reference now to FIG. 9, a flowchart illustrating a process for a folding iteration is depicted in accordance with the illustrative embodiments. The process in FIG. 9 may be implemented by a folding process, such as folding process 310, executing on a processing unit, such as processor 304 in FIG. 3.

The process begins by identifying a highest affinity level (step 902). The process determines whether folding one domain at this level results in folding the last node at this level (step 904). If a determination is made that folding one domain at this level would result in folding the last node, the process then determines whether there is a different domain within this affinity level (step 906). For example, at the highest affinity level, there may be only one domain, and folding the one domain would result in folding the last node. If a determination is made that there is a different domain within this affinity level, the process moves to a different domain within this affinity level (step 908), and returns to step 904. If a determination is made that there is not a different domain within this affinity level, the process moves to the next affinity level (step 910), and returns to step 904.

If a determination is made that folding one domain at this level would not result in folding the last node, the process then determines the domain load for each domain under this affinity level (step 912). Next, the process identifies the lightest loaded domain (step 914) at the current affinity level. The process then determines whether the lightest loaded domain under this affinity level is a node (step 916). If the determination is made that the lightest loaded domain under this affinity level is not a node, the process returns to step 910 and moves to the next affinity level. If the determination is made that the lightest loaded domain under this affinity level is a node, the process identifies the lightest loaded processing unit on the lightest loaded node (step 918). The process then folds the lightest loaded processing unit (step 920), with the process terminating thereafter.

The different illustrative embodiments recognize that current methods of processor folding are executed at the partition level. If the partition is idle, a virtual processor is folded. If the partition is busy, a virtual processor is unfolded. The current algorithm used to select a virtual processor to fold simply selects the processor with the highest central processing unit identifier in the sequence. Problems may arise in current methods when the non-uniform memory access (NUMA) properties of the partition are ignored. If the selected processor is the last available processor at the MCM, chipset, or even the core level, the partition essentially loses a level of affinity. As a result of losing the level of affinity, the processes and/or threads which had affinity at that level may be forced to migrate to another affinity domain. This migration defeats the purpose of trying to balance the workload of a partition.

The different illustrative embodiments also recognize that current methods may encounter additional problems with a selected processor to be folded belongs to that of a heavily loaded affinity domain. Removing processing power from a heavily loaded affinity domain may force work to be run on a different domain level. The performance impact of removing processing power from a heavily loaded affinity domain is much greater than removing processing power from a less loaded domain level.

Therefore, the different illustrative embodiments provide a method, apparatus, and computer program product for folding at each affinity level for a partition spanning multiple nodes. In one illustrative embodiment, a method is provided for identifying a number of domains in a number of affinity levels. A lightest loaded domain is identified in the number of domains identified. A number of nodes are identified in the lightest loaded domain identified. A lightest loaded node is identified in the number of nodes. A lightest loaded processing unit is identified on the lightest loaded node, and the lightest loaded processing unit is folded.

The different illustrative embodiments also provide a method for identifying a highest affinity level in a number of affinity levels. At least one affinity level in the number of affinity levels has a number of domains, and at least one domain in the number of domains includes a number of nodes. A determination is made as to whether folding one domain at the highest affinity level results in folding a last node at the highest affinity level. In response to a determination that folding one domain at the highest affinity level does not result in folding the last node, a domain load is determined for each domain at the highest affinity level. A lightest loaded domain is identified. In response to identifying the lightest loaded domain, a determination is made as to whether the lightest loaded domain is a node. If the lightest loaded domain is a node, a lightest loaded processing unit is identified on the node and the lightest loaded processing unit is folded.

The different illustrative embodiments provide a more focused and concentrated work environment where a limited number of virtual processors run longer than expected. This environment decreases virtual processor context switches, when running on a micro-partition, and increases cache warmth both on dedicated and micro-partition environments. On a dedicated partition, there is an added benefit when work is concentrated on a fewer number of virtual processors. The added benefit is that the idle time of the other virtual processors can be donated to a shared pool of processors, allowing shared partitions access to more central processing unit time.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for folding at each affinity level for a partition spanning multiple nodes, the method comprising:
identifying, by a computer processor, a highest affinity level in a number of affinity levels, wherein affinity comprises a memory access time, wherein at least one affinity level in the number of affinity levels has a number of domains, and wherein at least one domain in the number of domains includes a number of nodes;
determining, by the computer processor, whether folding one domain at the highest affinity level results in folding a last node at the highest affinity level;
responsive to a determination that folding one domain at the highest affinity level does not result in folding the last node, determining, by the computer processor, a domain load for each domain at the highest affinity level;
responsive to determining the domain load for each domain at the highest affinity level, identifying, by the computer processor, a lightest loaded domain;
responsive to identifying the lightest loaded domain, determining, by the computer processor, whether the lightest loaded domain is a node;
responsive to a determination that the lightest loaded domain is a node, identifying, by the computer processor, a lightest loaded processing unit on the node; and
folding, by the computer processor, the lightest loaded processing unit, wherein folding the lightest loaded processing unit directs work off of the lightest loaded processing unit and onto other processing unit;
responsive to a determination that the lightest loaded domain is not a node, moving by the computer processor to a next affinity level; and
recursively executing the determining and identifying steps until the lightest loaded processing unit is folded.

2. A non-transitory computer readable storage medium storing a computer program product having computer usable program codes, when executed by a computer, causes the computer to perform a method of folding at each affinity level for a partition spanning multiple nodes, the method comprising:
identifying a highest affinity level in a number of affinity levels, wherein affinity comprises a memory access time, wherein at least one affinity level in the number of affinity levels has a number of domains, and wherein at least one domain in the number of domains includes a number of nodes;
determining whether folding one domain at the highest affinity level results in folding a last node at the highest affinity level;
responsive to a determination that folding one domain at the highest affinity level does not result in folding the last node, determining a domain load for each domain at the highest affinity level;
responsive to determining the domain load for each domain at the highest affinity level, identifying a lightest loaded domain;
responsive to identifying the lightest loaded domain, determining whether the lightest loaded domain is a node;
responsive to a determination that the lightest loaded domain is a node, identifying a lightest loaded processing unit on the node; and
folding the lightest loaded processing unit, wherein folding the lightest loaded processing unit directs work off of the lightest loaded processing unit and onto other processing units;
responsive to a determination that the lightest loaded domain is not a node, moving to a next affinity level; and
recursively executing the determining and identifying steps until the lightest loaded processing unit is folded.

3. An apparatus comprising:
a non-transitory computer readable storage medium;
a number of processing units;
an operating system executing on at least one processing unit in the number of processing units to identify a highest affinity level in a number of affinity levels, wherein affinity comprises a memory access time, wherein at least one affinity level in the number of affinity levels has a number of domains, and wherein at least one domain in the number of domains includes a number of nodes; determine whether folding one domain at the highest affinity level results in folding a last node at the highest affinity level; responsive to a determination that folding one domain at the highest affinity level does not result in folding the last node, determine a domain load for each domain at the highest affinity level; responsive to determining the domain load for each domain at the highest affinity level, identify a lightest loaded domain; responsive to identifying the lightest loaded domain, determine whether the lightest loaded domain is a node; responsive to a determination that the lightest loaded domain is a node, identify a lightest loaded processing unit on the node; and fold the lightest loaded processing unit, wherein folding the lightest loaded processing unit directs work off of the lightest loaded processing unit and onto other processing units; responsive to a determination that the lightest loaded domain is not a node, move by the computer processor to a next affinity level; and recursively execute the determining and identifying steps until the lightest loaded processing unit is folded.

* * * * *